US008677677B2

(12) United States Patent
Schneidmiller et al.

(10) Patent No.: US 8,677,677 B2
(45) Date of Patent: Mar. 25, 2014

(54) ILLUMINATED INSECT TRAP

(75) Inventors: Rodney G. Schneidmiller, Greenacres, WA (US); Qing-He Zhang, Spokane Valley, WA (US); Marc Chapin, Spokane, WA (US)

(73) Assignee: Sterling International Inc., Spokane, WA (US)

( * ) Notice: Subject to any disclaimer, the term of this patent is extended or adjusted under 35 U.S.C. 154(b) by 0 days.

(21) Appl. No.: 13/443,574

(22) Filed: Apr. 10, 2012

(65) Prior Publication Data

US 2012/0204475 A1 Aug. 16, 2012

Related U.S. Application Data

(63) Continuation-in-part of application No. 13/331,394, filed on Dec. 20, 2011.

(60) Provisional application No. 61/435,647, filed on Jan. 24, 2011, provisional application No. 61/453,033, filed on Mar. 15, 2011, provisional application No. 61/477,044, filed on Apr. 19, 2011.

(51) Int. Cl.
*A01M 1/04* (2006.01)

(52) U.S. Cl.
USPC .......................................... 43/113; 43/132.1

(58) Field of Classification Search
USPC ................. 43/107, 113, 121, 124, 131, 132.1
See application file for complete search history.

(56) References Cited

U.S. PATENT DOCUMENTS

| 726,604 | A | | 4/1903 | Williamson | |
|---|---|---|---|---|---|
| 1,693,368 | A | * | 11/1928 | Cherry | 43/113 |
| 1,833,699 | A | * | 11/1931 | Wolf | 43/113 |
| 2,065,047 | A | * | 12/1936 | Smith | 43/113 |
| 2,113,409 | A | * | 4/1938 | Niemeyer | 43/113 |
| 3,465,468 | A | * | 9/1969 | Takamoto | 43/113 |
| 4,551,941 | A | | 11/1985 | Schneidmiller | |
| 4,706,410 | A | | 11/1987 | Briese | |

(Continued)

FOREIGN PATENT DOCUMENTS

EP 1 138 199 A2 10/2001

OTHER PUBLICATIONS

International Search Report and Written Opinion mailed Oct. 29, 2012, issued in corresponding International Application No. PCT/US2012/032921, filed Apr. 10, 2012, 7 pages.

(Continued)

*Primary Examiner* — David Parsley
(74) *Attorney, Agent, or Firm* — Christensen O'Connor Johnson Kindness PLLC

(57) ABSTRACT

An insect trap and lighting device for an insect trap suitable for trapping light-attracted insects, in particular indoor nuisance insects that overwinter indoors, including true bugs, lady beetles, and flies. The lighting device may be attached to the base or the top of the trap, and includes light-emitting elements that are directed towards the trap, and are configured to lure target insects toward the trap entryway. In an embodiment, the trap includes an entrapment chamber with an internal cone with an opening at both ends, and a collar over a distal end. A vanes assembly extends toward entryways. In an embodiment, the light fixture comprises a cap that fits over the trap and directs light into the trap through the entrapment chamber wall. The lighting elements may be selected to emit light in a narrow band selected to attract the target insect.

6 Claims, 15 Drawing Sheets

(56) References Cited

U.S. PATENT DOCUMENTS

| | | |
|---|---|---|
| 4,856,226 A | 8/1989 | Taylor |
| 5,274,949 A * | 1/1994 | Beaton ............................. 43/113 |
| 5,301,456 A * | 4/1994 | Jobin et al. ..................... 43/113 |
| 5,311,696 A * | 5/1994 | Gauthier et al. ................ 43/113 |
| 5,392,560 A | 2/1995 | Donahue |
| 6,817,139 B1 * | 11/2004 | Powell et al. ................... 43/113 |
| 6,910,298 B2 | 6/2005 | Schneidmiller |
| 7,150,125 B1 | 12/2006 | Mizell, III |
| D544,065 S | 6/2007 | MacQueen |
| 7,308,774 B2 * | 12/2007 | Lin ................................. 43/113 |
| D561,297 S | 2/2008 | Schneidmiller |
| 7,412,797 B1 | 8/2008 | Hiscox |
| D590,041 S | 4/2009 | Schneidmiller |
| 7,886,481 B2 | 2/2011 | Schneidmiller |
| 7,937,887 B2 * | 5/2011 | Child ............................... 43/139 |
| D645,535 S | 9/2011 | Schneidmiller |
| 8,028,467 B2 | 10/2011 | Bagnall |
| 8,051,600 B2 | 11/2011 | Schneidmiller |
| 8,056,282 B2 | 11/2011 | Schneidmiller |
| 2005/0155277 A1 * | 7/2005 | Bagnall et al. ................. 43/113 |
| 2008/0263938 A1 * | 10/2008 | Schneidmiller et al. ........ 43/122 |
| 2009/0025275 A1 * | 1/2009 | Cohnstaedt et al. ............ 43/113 |
| 2009/0151227 A1 | 6/2009 | Schneidmiller |
| 2012/0167450 A1 * | 7/2012 | Frisch ............................. 43/113 |

OTHER PUBLICATIONS

"Strube's Stink Bug Traps: The Traps That Work!" Strube's Stink Bug Traps LLC, Columbia, Pa., <http://www.stinkbugtrapsonline.com> [retrieved May 14, 2012], available since 2010, 3 pages.

* cited by examiner

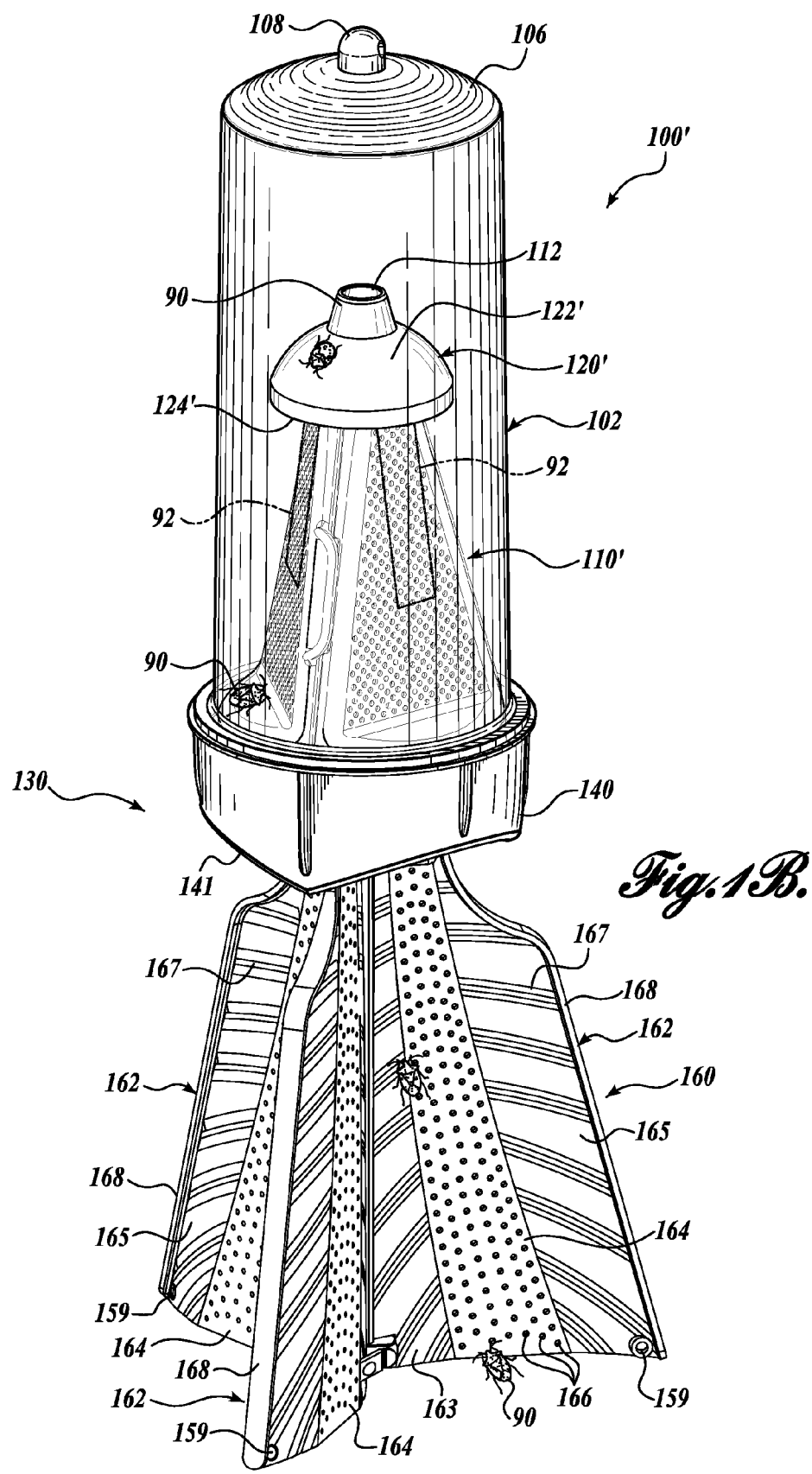

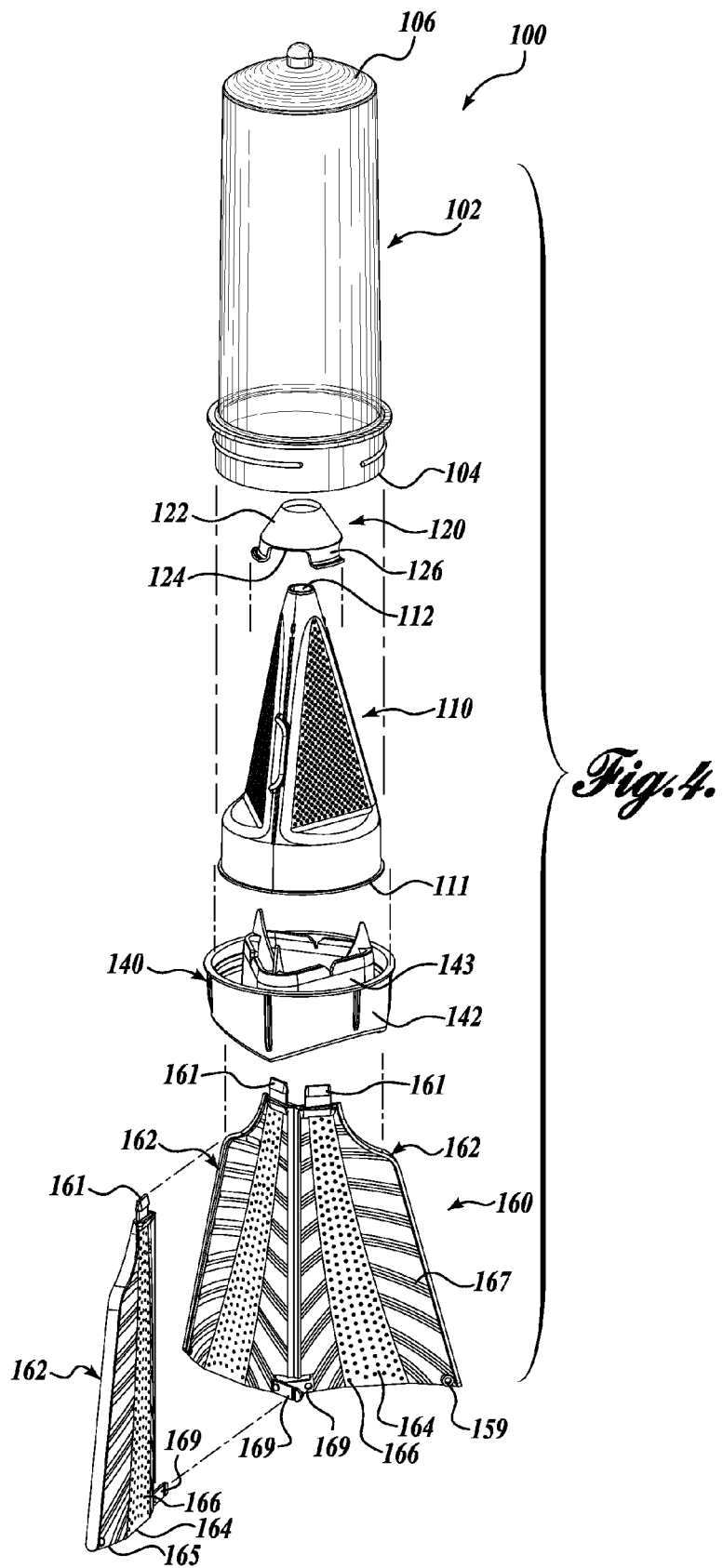

ILLUMINATED INSECT TRAP

CROSS-REFERENCES TO RELATED APPLICATIONS

This application is a continuation-in-part of U.S. patent application Ser. No. 13/331,394, filed Dec. 20, 2011, which claims the benefit of U.S. Provisional Application No. 61/453,033, filed Mar. 15, 2011, and U.S. Provisional Application No. 61/435,647, filed Jan. 24, 2011. This application also claims the benefit of U.S. Provisional Application No. 61/477,044, filed Apr. 19, 2011. Each of these applications is hereby incorporated by reference in its entirety.

BACKGROUND

Pesticides, such as insecticides, are commonly used in agricultural, industrial, and residential settings to battle destructive, pestiferous, and/or disease-carrying insects and other animals. Pesticides have achieved significant successes in controlling pestiferous and disease-vector animals, and have increased in their lethality over the years. However, increasingly, the environmental and human health effects of pesticides, as well as their deleterious effects on beneficial insect species and other animals, have caused users to seek other means for controlling pest populations.

Pentatomoidea is a superfamily of insects that includes some of the stink bugs and shield bugs. The name stink bug derives from their tendency to eject an odiferous defensive substance when disturbed, typically as a form of anti-predator adaptation. The term "stink bug" is also applied to distantly related species such as *Boisea trivittata* (Say), the "boxelder bug," and insects such as beetles in the genus *Eleodes*, such as the pinacate beetle (also known as the stink beetle). Many stink bugs and shield bugs are considered agricultural pest insects. They can generate large populations that damage crop production and are resistant to many pesticides. Moreover, they are often immune to crops that have been genetically modified to be pest-resistant, such as Bt crops (i.e., crops having the protein known as the Bt toxin). Over the past 5-10 years, stink bugs and similar plant pests have become the most serious pest problems in many parts of the world, especially in regions with large areas of Bt crops.

For example, the brown marmorated stink bug (BMSB), the *Halyomorpha halys* (Stal) native to Asia, is believed to have been accidentally introduced into the United States as early as 1996, likely as stowaways, possibly as eggs, on packing crates or the like. The BMSB has been recorded in a total of 33 states and the District of Columbia, according to information provided by the National Agricultural Pest Information System (NAPIS) (http://pests.ceris.purdue.edu). In 2010, the BMSB emerged as a severe pest of fruit and other crops across the region. In addition, this invasive species is a serious nuisance for homeowners and businesses as it overwinters in residential houses, commercial buildings, and warehouses.

The BMSB can cause widespread damage to fruit and vegetable crops including peaches, apples, green beans, soybeans, corns, tomatoes, cherries, raspberries, and pears. It is a sucking insect that uses its proboscis to pierce the host plant in order to feed. This feeding may cause necrotic areas on the outer surface of fruits, leaf stippling, cat-facing on tree fruits, seed loss, and transmission of plant pathogens. Frequently, the BMSB survives the winter as an adult by entering structures that shield them from the elements. Inside a house they may initially begin to hibernate and then become more animated due to the warmth of the house.

One of the present inventors has pioneered insect control systems that do not rely on hazardous pesticides to capture and control pest insect populations. For example, U.S. Pat. No. 4,551,941, to Schneidmiller, discloses an insect trap selective for wasps that uses an attractant to attract insects into a chamber wherein the insect becomes trapped. In U.S. Pat. No. 4,638,592, also to Schneidmiller, a fly trap and attractant are disclosed that do not rely on insecticides.

In U.S. Pat. No. 7,150,125, Mizell discloses a trap designed for insects, such as stink bugs, similar to the so-called Tedders trap and including a bottom portion formed from two intersecting and tapered planar portions and a bag-like top portion that fits over the lower portion. The Mizell trap, however, does not take advantage of certain behavioral characteristics of the stink bug, and therefore could be more effective. There remains a need for more effective traps for stink bugs, other true bugs, and other pestiferous insects. In particular, improvements in methods and systems for attracting such insects to traps and in enticing attracted insects into entering traps are needed. Methods for attracting and enticing insects that do not rely on toxic chemicals and that may be used indoors as well as outdoors are further desirable.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Both a lighting device for an insect trap and an insect trap with a lighting device are disclosed. In an embodiment, the device includes a support structure and one or more lighting elements that are disposed externally of an entrapment chamber for the target insects, and emits light into the entrapment chamber during use.

In an embodiment the device includes a plurality of lighting elements, which may be light-emitting diodes (LEDs), and are selected to emit light at a frequency that is selected to attract the target insects. In a particular embodiment, the lighting elements emit light with wavelengths in the range of 385 nm to 495 nm, and in another embodiment, the lighting elements emit light with wavelengths in the range of 450 nm to 495 nm. In a particular embodiment, the trap is configured for trapping true bugs such as stink bugs. In an embodiment, the illumination device includes one or more additional lighting elements that emit white light.

In an embodiment, the illumination device support structure is configured with a recess, or in a cap-type configuration, that is sized to slidably engage an upper end of the entrapment chamber.

In an embodiment, the illumination device support structure is formed as a stand that slidably receives a bottom end of the insect trap.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1B is a perspective view of a second embodiment of an insect trap in accordance with the present invention, shown with a hemispherical collar;

FIG. 4 is a partially exploded view of the insect trap shown in FIG. 1A;

DETAILED DESCRIPTION

Figure 1A:
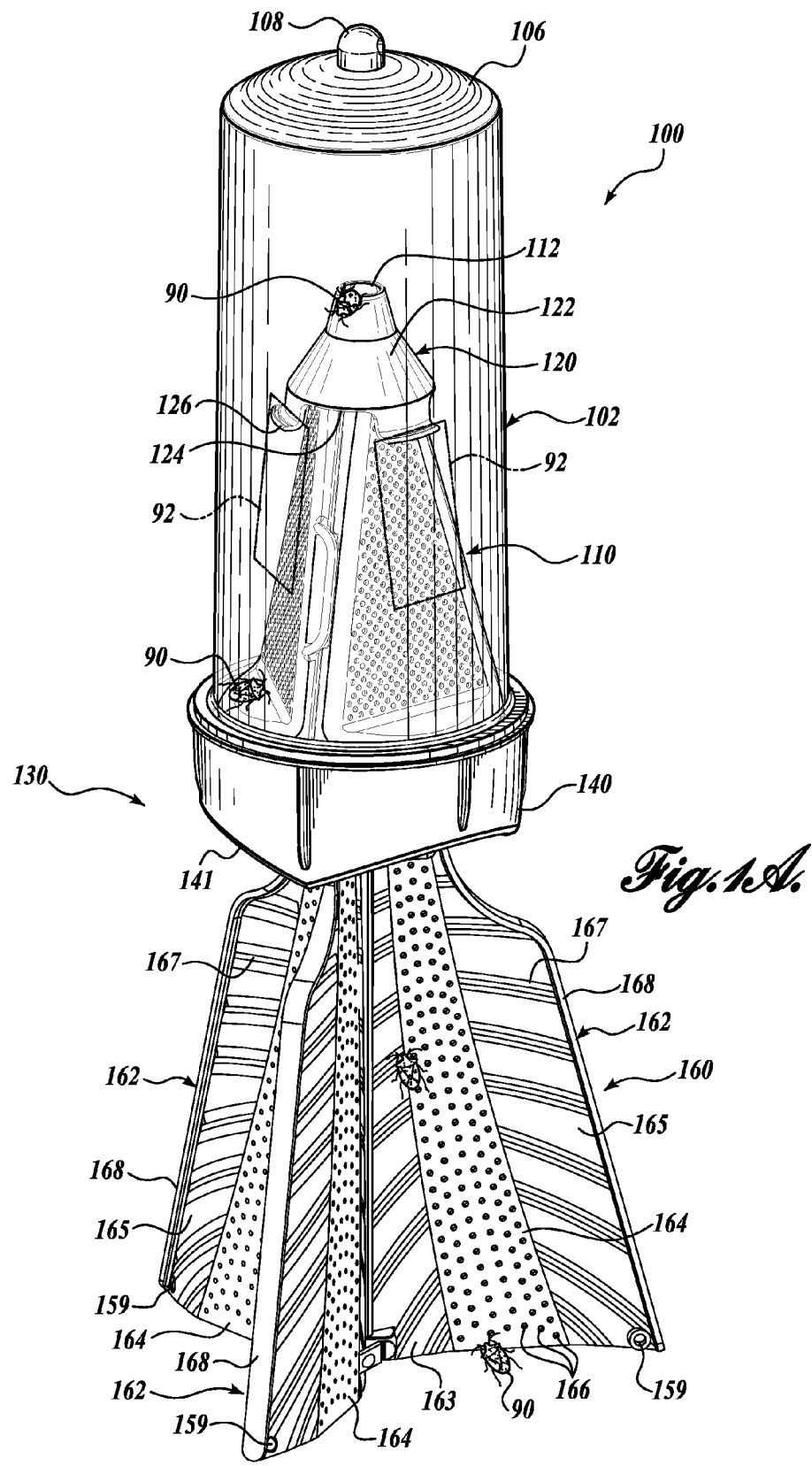
FIG. 1A is a perspective view of an insect trap in accordance with the present invention, shown with a frustoconical collar incorporating attractant hooks.
Figure 2:
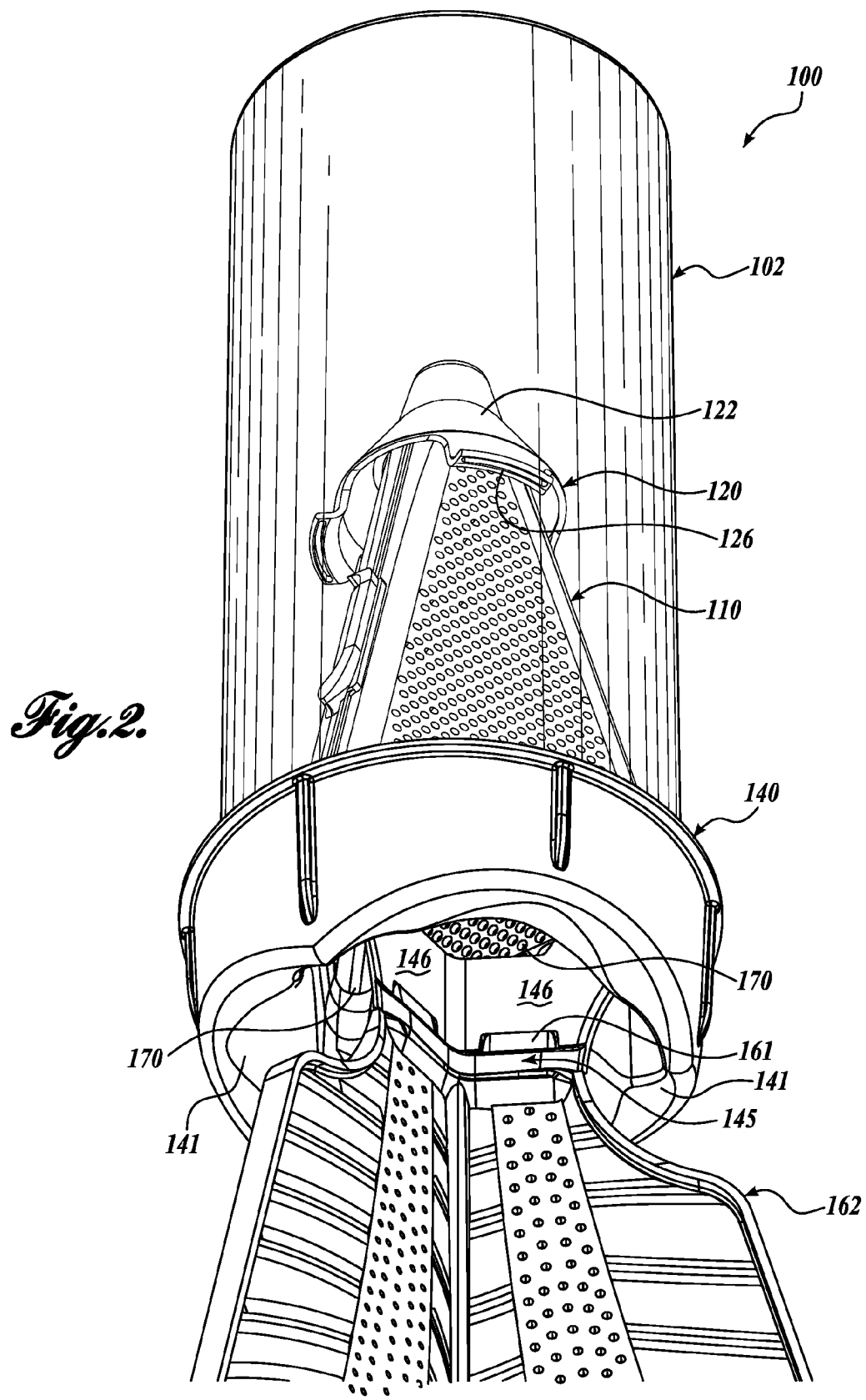
FIG. 2 is a fragmentary perspective view of the insect trap shown in FIG. 1A, showing trap entryways.
Figure 3:
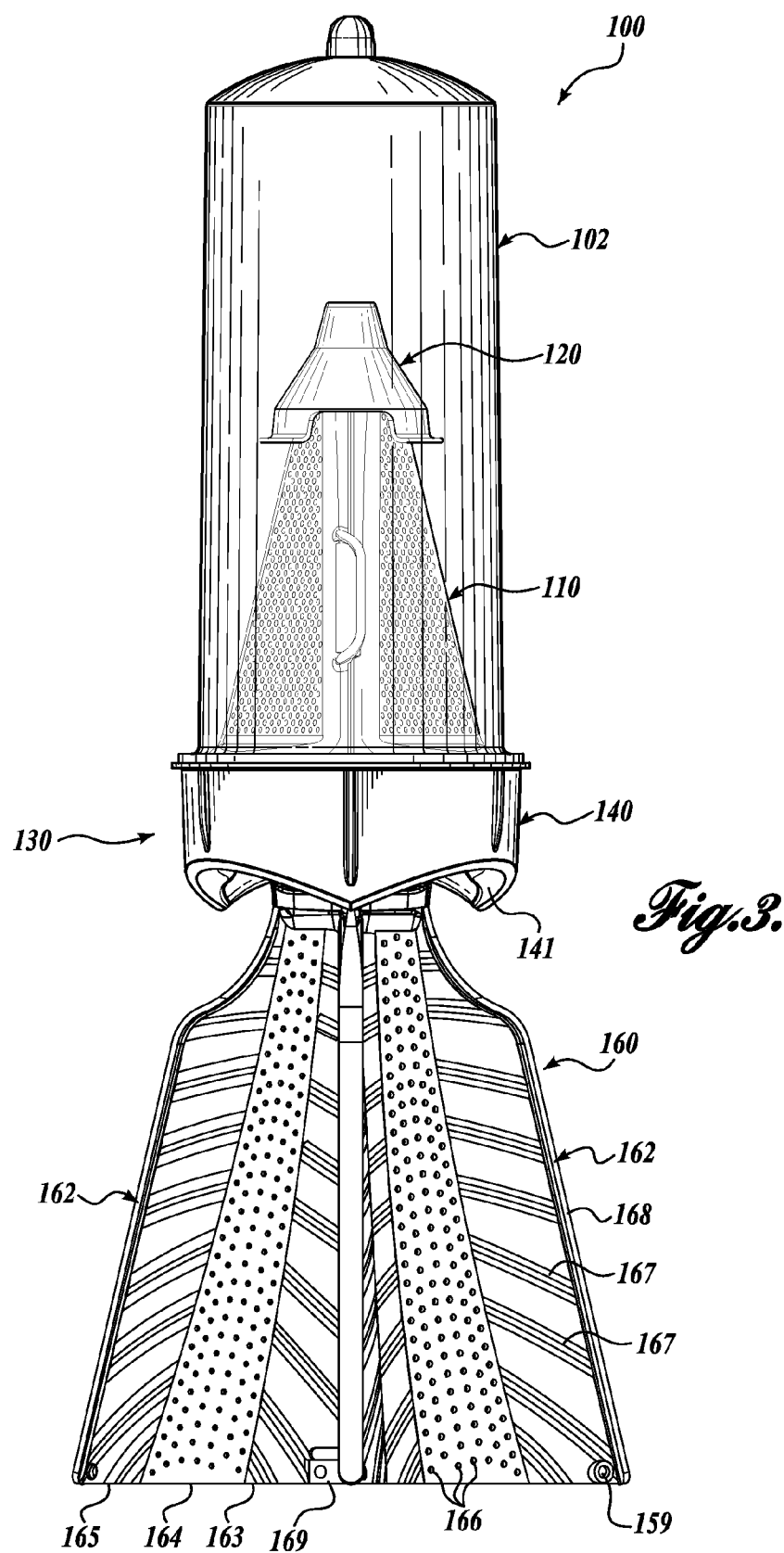
FIG. 3 is a front view of the insect trap shown in FIG. 1A.

Preferred embodiments of insect traps in accordance with the present invention will now be described with reference to the figures wherein like numbers indicate like parts. As will be apparent from the description below, the disclosed traps are designed to take advantage of certain innate behavioral tendencies and instinctive characteristics of the target insect species. In addition to stink bugs (e.g., BMSBs, kudzu bugs, etc.), it is contemplated that the teachings of the present invention may be applied to trapping other true bugs (Hemiptera), including, for example, shield bugs and plant bugs (e.g., boxelder bugs). Furthermore, the present invention may be applied to trapping other groups of insects, such as Asian lady beetles, convergent lady beetles, and cluster flies, especially those insects overwintering as adults in houses or other man-made structures. FIG. 1A is a perspective view of an insect trap 100 in accordance with the present invention that is particularly suited for capturing insects 90 such as stink bugs, for example, brown marmorated stink bugs and the like. A second fragmentary perspective view of the insect trap 100 is shown in FIG. 2. A front view of the insect trap 100 is shown in FIG. 3, and a partially exploded, perspective view is shown in FIG. 4.

The trap 100 comprises an entrapment chamber 102, which in this embodiment is a generally cylindrical member that is open at a bottom end 104 and closed at a top end 106. However, it will be readily apparent that the entrapment chamber may be alternatively shaped without departing from the present invention. The top end 106 may optionally include a nib 108 to facilitate securing the trap 100 at a desired location. The entrapment chamber 102 may be formed from a transparent or translucent material to permit light to enter the entrapment chamber 102. It is also contemplated that the color of the entrapment chamber 102 will preferably be selected to attract the target species. For example, the brown marmorated stink bug may be particularly attracted to green, blue, or other dark color(s).

An inner member herein referred to as an entry cone 110 is disposed in the entrapment chamber 102. As will be apparent from the figures, the term "cone" should be interpreted broadly, and that the currently preferred entry cone 110 is neither a right circular cone nor an axisymmetric cone. The entry cone 110 also does not taper to a point. In the present embodiment, the entry cone 110 tapers from a large opening 111 at a bottom or proximal end disposed near one end 104 of the entrapment chamber to a small opening 112 at a distal end disposed inside the entrapment chamber 102. The entry cone 110 is described in more detail below. A collar 120 is positioned over a top end of the entry cone 110. The collar 120 includes a frustoconical upper portion 122 with a top edge that engages the entry cone 110 and a lower edge 124 that extends away from the entry cone 110. Optionally, one or more hook members 126 may extend down from the lower edge 124 of the collar 120.

Preferably, the surface of the frustoconical upper portion 122 is provided with a slippery or non-stick upper surface to facilitate the target insects 90 falling from the collar 120 towards the bottom of the entrapment chamber 102, and to prevent insects 90 from crawling back out of the trap 100. For example, the upper portion 122 may include a layer of polytetrafluoroethylene powder (e.g., with a particle size of 0.1 to 3.0 microns) such as that marketed under the trade name Teflon® or Fluon®. In an exemplary treatment, the polytetrafluoroethylene powder layer is achieved by applying (e.g., dipping or spraying) to the upper portion 122 an aqueous solution of polytetrafluoroethylene powder and a surfactant, for example, an ethylene oxide/propylene oxide copolymer such as that marketed under the trade name Tergitol®. Of course, it will be readily apparent to persons of skill in the art that other known materials and/or application methods may alternatively be utilized to achieve a similar result.

The upper portion 122 may also include a layer of porous film, for example, with a pore size of 0.1 to 3.0 microns and porosity of 20-50%; such film can be made from aluminum oxide or any other organic or inorganic material that could create the pore sizes and porosity in the above-referenced ranges. Furthermore, the entire collar 120 may be made from a porous material (e.g., with "slippery" pore sizes and porosities) that is strong enough to withstand the insect activities.

A base portion 130 of the trap 100 includes a lid 140, which may be substantially annular. The lid 140 releasably engages the bottom end 104 of the entrapment chamber 102. A vane assembly 160, which in this embodiment comprises a plurality of panels or vanes 162 (three shown), extends downwardly from the lid 140.

As illustrated in phantom in FIG. 1A, one or more sources of attractant 92 may be enclosed within the entrapment chamber 102. In an exemplary embodiment, the attractant 92 is containerized in a dispenser that provides for a gradual release of the attractant 92. In the trap 100 shown in FIG. 1A, each attractant package 92 is retained on one of the hook members 126 of the collar 120. Alternatively, it is contemplated that the attractant 92 may simply be placed between the entrapment chamber 102 and the entry cone 110.

The attractant may be a pheromone (or kairomone) derived from the target insect or from a related insect or a host plant, for example. The brown marmorated stink bug has been found to be attracted in the field to the aggregation pheromone of the brown-winged green bug, *Plautia stali*, methyl (2E,4E,6Z)-decatrienoate (2E,4E,6Z-10:COOMe). One theory for this cross-attraction is that the brown marmorated stink bug exploits the pheromone of the brown-winged green bug to find food and/or hibernation sites. In the preferred embodiment, the attractant 92 is disposed between the entrapment chamber 102 and the entry cone 110. This configuration provides a higher vapor concentration of attractant in the entrapment region of the trap outside the entry cone 110 to further encourage the insects 90 to continue through the small aperture 112 into the region outside of the entry cone 110.

Figure 6:
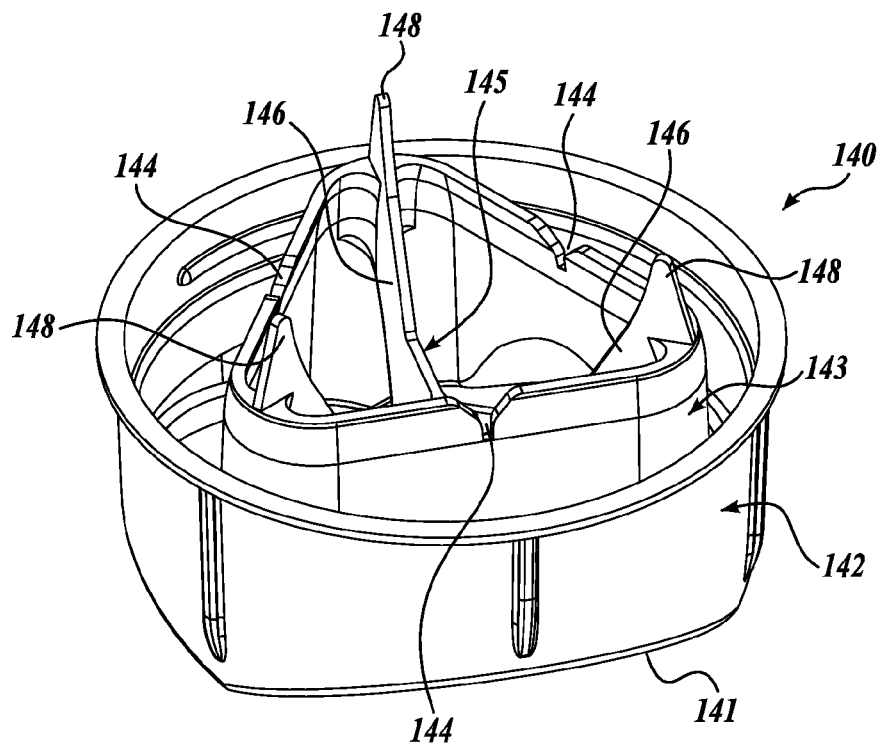
FIG. 6 is a perspective view of the lid for the exemplary insect traps shown in FIGS. 1A and 1B, viewed from above.
Figure 7:
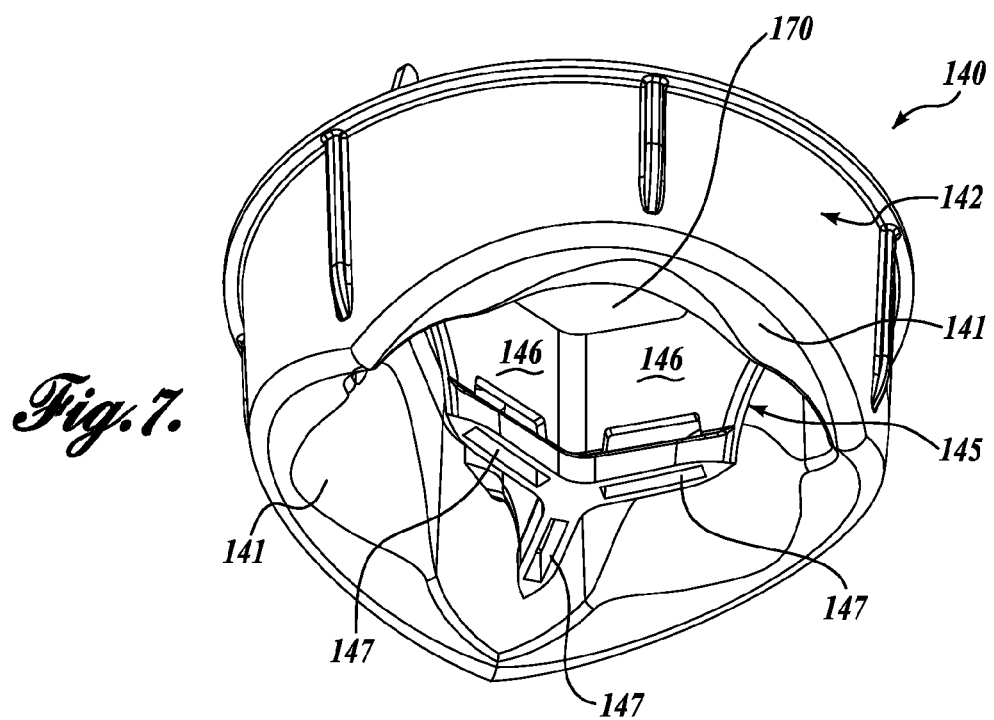
FIG. 7 is a perspective view of the lid for the exemplary insect traps shown in FIGS. 1A and 1B, viewed from below.

FIGS. 6 and 7 show perspective views of the lid 140 in isolation. The lid 140 is advantageously formed in an organic shape with contoured lower surfaces 141. The organic shape improves the efficacy of the trap 100 by avoiding right angles and box-like appearances that may deter insects 90 from entering the trap 100. An outer wall 142 of the lid 140 includes interior threads configured to engage corresponding threads on the entrapment chamber 102. The outer wall 142 may also include knurls, grip tape, or the like to facilitate attaching and removing the lid 140.

The lid 140 in this embodiment further includes an inner wall 143 that is spaced inwardly from the outer wall 142. The inner wall 143 is generally triangular with rounded corners to correspond with the three vanes 162. Of course, it is contemplated that the inner wall may be shaped differently, for example, to accommodate a different number of vanes. A central support structure 145 is fixed to, or co-formed with, the lid 140, and comprises three panels 146 that extend radially from a shared edge generally along the centerline of the triangular inner wall 143. It will now be appreciated that the support structure 145 and inner wall 143 thereby define three apertures or entryways 170 (one visible, see also FIG. 2) through the lid 140 and into the trap 100. Each of the three panels 146 has a lower edge that defines a retaining aperture 147 or other mechanism for attachment of the vanes 162. As seen most clearly in FIG. 6, the panels 146 in the present embodiment include an extending portion 148 that extends above the upper edge of the inner wall 143. The extending portion 148 is positioned to have an edge that is near, or abuts, the entry cone 110, providing a bridge from the entryway 170 to the entry cone 110. As also seen in FIG. 6, the upper edge of the inner wall 143 further includes three slots 144 that are positioned to receive corresponding tabs 116 (FIG. 5A) in the entry cone 110, as discussed below.

Figure 5A:
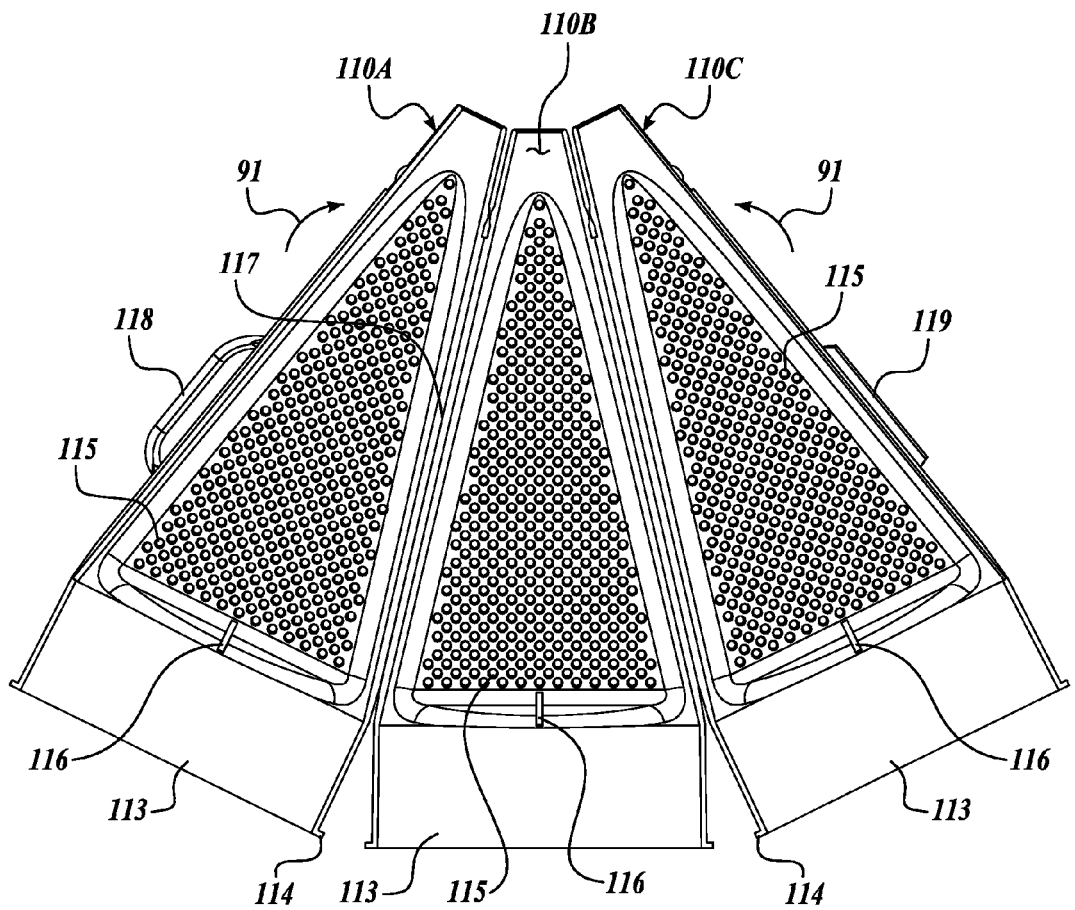
FIG. 5A is an unassembled view of an entry cone structure for the exemplary insect trap shown in FIG. 1A.

An unassembled view of the current entry cone 110 is shown in FIG. 5A. Although many of the details of the construction are not critical to the present invention, the currently preferred embodiment is herein described for completeness. An alternative construction of the entry cone is disclosed in the priority provisional application cited and incorporated by reference above. The entry cone 110 in this embodiment is made of a pliable plastic with three segments 110A, 110B, and 110C formed as a single unit, with hinges 117 integrally formed between neighboring sections.

End segment 110A includes a connector ring 118 on one edge, and the other end segment 110C includes a locking member 119 that is sized to snap into the connector ring 118 to form the entry cone 110. The segments 110A, 110B, 110C each include a lower portion 113 that is shaped such that when assembled, the lower portions 113 cooperatively define a cylindrical portion that slides snugly into the entrapment chamber 102. A flange 114 abuts the bottom edge of the entrapment chamber 102. Generally, triangular panel portions 115 extend upwardly from the lower portions 113. The panel portions 115 are perforated to encourage insects 90 to climb by permitting for the transmission of light and air therethrough. Each of the segments 110A, 110B, 110C includes a tab 116 that is positioned to engage the lid slots 144 described above.

To assemble the entry cone 110, the end segments 110A and 110C are pivoted about the hinges 117 as indicated by arrows 91, and the locking member 119 is inserted to engage the connector ring 118.

The panels 146 of the central support structure 145 described above provide a path for insects to climb from the vanes 162 to the inside surface of the entry cone 110. When the trap 100 is in an upright position (see FIG. 3), the panel portions 115 of the entry cone 110 are disposed at a relatively small angle from vertical, for example, the panel portions 115 may be less than 30° from vertical. This relatively gentle angle facilitates and encourages the target insects 90 to continue to climb the near-vertical wall defined by the panel portions 115. Also, the panels 146 defining the central support structure 145 are essentially vertical with the extending portions 148 extending upwardly to approximately abut the panel portions 115 of the entry cone 110. The vertical and near-vertical orientation of the panels 146 and the panel portions 115 take advantage of the stink bug's behavioral tendencies to climb upward on a vertical or near-vertical surface.

Refer again to FIGS. 1A and 4. The vanes 162 are optionally designed with particular features that also take advantage of the behavioral tendencies of the stink bug 90. Stink bugs 90, for example, tend to alight on a surface, such as the ground, and climb. For example, they may approach and even strike the vane 162 causing them to land at the base of the vane 162. The vanes 162 are designed to encourage the insect 90 to climb the vane 162 and to enter the entrapment chamber 102.

In this exemplary embodiment, the vanes 162 are each curved in a horizontal cross section to provide a more natural and organic shape that will be more inviting to the insect 90. For example, the vanes 162 may each be curved about a generally vertical axis. As seen most clearly in FIGS. 1A and 1B, the vanes 162 may include a center portion 164 that is substantially planar, an inner portion 163 extending inwardly from the center portion 164, and an outer portion 165 extending outwardly from the center portion 163, wherein the inner and outer portions 163, 165 are curved or angled with respect to the center portion 164.

The vanes 162 are further provided with surface features that encourage and facilitate climbing. For example, in the present embodiment, the center portions 164 are provided with a plurality of apertures 166 that extend along the length of the vane 162. The apertures 166 facilitate climbing by providing a perch for the insects 90, and also permit air and light to penetrate, again providing a more organic-mimicking environment to encourage continued climbing. The inner portion 163 and outer portion 165 of each vane 162 further include a plurality of surface ridges 167 that extend generally from the center portion 164 to the inner and outer edges of the vane 162. The ridges 167 generally mimic a leaf vein structure and further facilitate climbing the vane 162, and gently encourage the insects 90 toward the center portion 164. The outer edge of each vane 162 is further provided with a flange 168, such that climbing insects 90 are directed upwardly.

As seen most clearly in FIGS. 2 and 4, the upper end of the vanes 162 includes a tab 161 that is sized and configured to lockingly engage the retaining apertures 147 (see FIG. 7) in the lid 140 to attach the vanes 162 to the lid 140. In addition, each vane 162 includes a lower attachment tab 169 with a natural hinge to permit articulation of the tab 169. The three lower attachment tabs 169 interconnect to connect the three vanes 162 at the bottom end. Optionally, the vanes 162 may further comprise means for fixing the trap 100 at a particular location. For example, apertures 159 in the lower outside corners of each vane 162 in the current embodiment may be provided with a string, cable, tie wrap, or the like (not shown) that can be secured to a fixed object, such as a portion of a tree, a pipe, etc.

FIG. 1B is a perspective view of another insect trap 100' in accordance with the present invention. This embodiment is similar in many aspects to the insect trap 100 described above, including the vane assembly 160, annular lid 140, and entrapment chamber 102. Descriptions of common features will not be repeated here, for brevity and clarity. In this embodiment, the entry cone 110' and the collar 120' are different from corresponding components of the trap 100 shown in FIG. 1A.

Figure 5B:
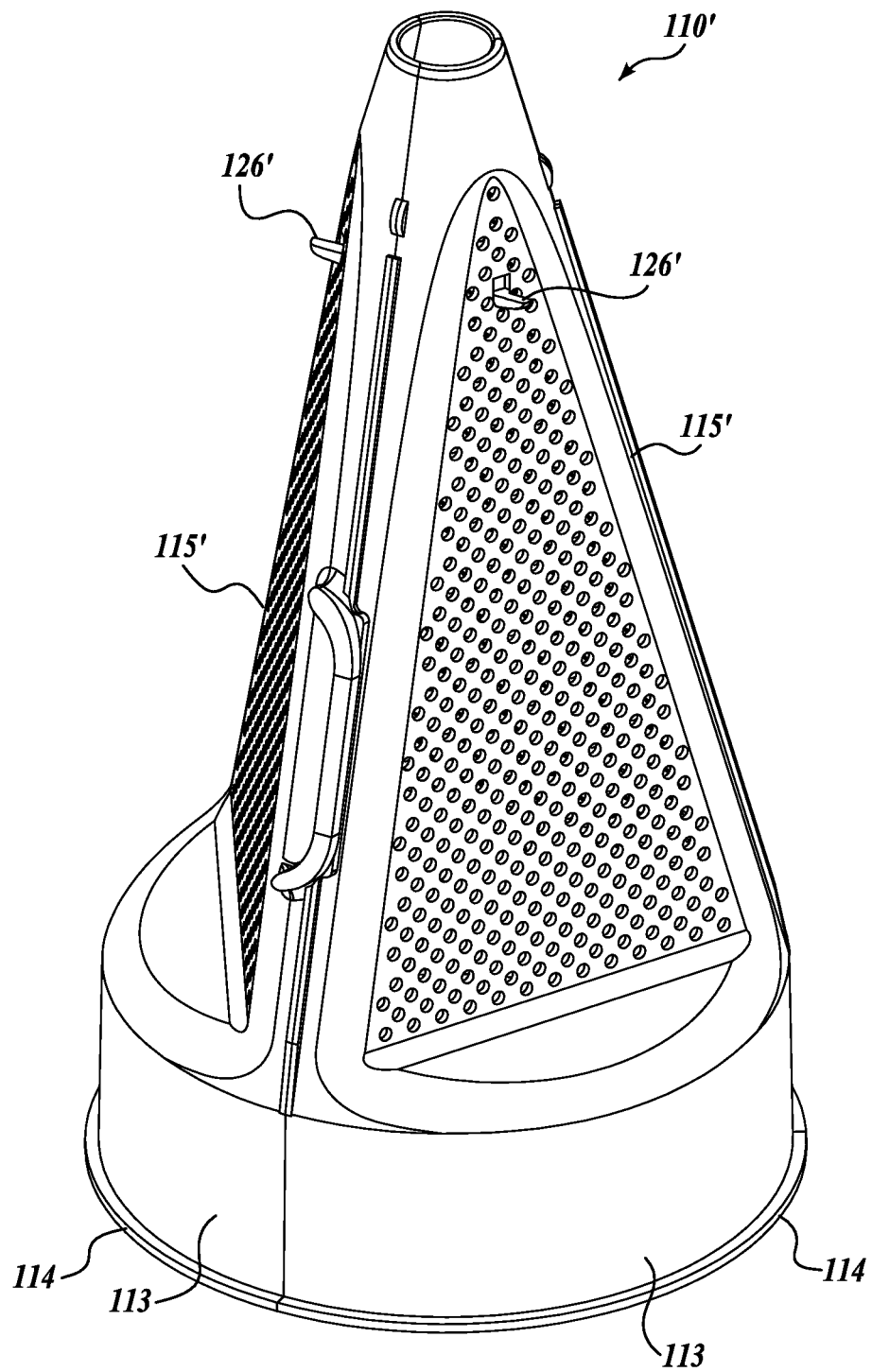
FIG. 5B is a perspective view of an entry cone structure for the exemplary insect trap shown in FIG. 1B, similar to the entry cone structure shown in FIG. 5A but including outwardly oriented hooks for supporting attractants.

FIG. 5B shows the entry cone 110' for the insect trap 100'. The entry cone 110', which may be formed as a unitary component and assembled similarly to the entry cone 110 of FIG. 5A, includes one or more outwardly extending hooks 126' that extend from one or more of the panel portion 115' of the entry cone 110', and provides a means for securing a package of the attractant 92 to the entry cone 110'. The other aspects of the entry cone 110' are otherwise similar to the entry cone 110 described above.

Refer again to FIG. 1B, wherein the collar 120' in this embodiment is approximately hemispherical in shape and relatively larger than the collar 120 shown in FIG. 1A. The upper surface 122' of the collar 120' is preferably provided with a slippery or non-stick coating, or with surface features that render the surface slippery to the target insects 90, as discussed above. The lower edge 124' is disposed away from the entry cone 110', thereby preventing a trapped insect from crawling back up to the top of the entry cone 110'.

The generally hemispherical construction of the collar 120' provides certain advantages over the frustoconical collar 120 discussed above. In particular, the curvature of the upper surface 122' is close to horizontal near the center aperture wherein the collar 120' abuts the entry cone 110'. The target insect is therefore more likely to perceive the collar 120' as a suitable surface for egress and crawl off of the entry cone 110'. The slope of the upper surface 122' increases from near-horizontal to near-vertical as the insect moves away from the entry cone 110', such that the insect reaches a point of no return even before falling from the collar 120'.

As will be apparent from the partially exploded view shown in FIG. 4, to assemble the trap 100 or 100' the tab 161 of each vane 162 is inserted into a corresponding retaining aperture 147 in the lid 140 support structure 145, and the optional lower attachment tabs 169 are interconnected. The entry cone 110 or 110' is positioned in the lid 140 between the inner wall 143 and outer wall 142. The collar 120 or 120' is placed over the top end of the entry cone 110 or 110' such that the top edge of the collar 120, 120' abuts the entry cone 110, 110'. One or more packages of attractant 92 are inserted into the entrapment chamber 102, for example, hung from the hook portions 126 of the collar 120 or the hook 126' of the entry cone 110', and the entrapment chamber 102 is placed over the entry cone 110, 110' and threadably engages the lid 140. The assembled trap 100, 110' may then be placed at a location where the target insects, e.g., stink bugs, are to be trapped. One or more of the apertures 159 in the vanes 162 and/or the nib 108 at the top of the entrapment chamber 102 may be used (e.g., with wire, string or the like) to fix the trap 100, 110' at the location, and to prevent the trap 100, 100' from toppling or otherwise being inadvertently repositioned, for example, by the wind. (For clarity, unless otherwise indicated, the remainder of the disclosure will be understood to apply to any of the disclosed embodiments, without citing alternate drawing identifiers.)

The attractant, e.g., a pheromone attractant, disposed in the trap is preferably packaged, formulated, or otherwise adapted to release gradually over time. The concentration of attractant will naturally rise within the entrapment chamber and escape through the entryways 170 to generate a plume. The plume will, in general, increase in concentration as it is followed towards the trap 100. In particular, the attractant concentration will generally be greatest in and around the trap 100. Target insects will therefore be attracted first to the general vicinity of the trap 100 by the external plume. The typical instinctual behavior of the stink bugs, such as the brown marmorated stink bug, is to land near or on a vertical structure and to climb upwardly. In the present trap 100, stink bugs landing near or on the vanes 162, drawn by the attractant plume, will sense an organically configured surface defined by the shape and surface features of the vanes 162, and will be motivated to climb the vanes 162 by the increasing concentration of attractant as the insect moves nearer the entryways 170.

The contoured surfaces 141 of the annular lid 140 provide a more natural appearing environment such that the insects 92 are not deterred from proceeding through the entryways 170, where nearly vertical surfaces defined by the panel portions 115 of the entry cone 110 invite further climbing. Upon reaching the small opening 112 at the top of the entry cone 110 (toward a relatively open space beyond), the insects 92 proceed, but the relatively steep angle and smooth surface of the entry cone 110 and collar 120 cause the insect to slide or fall down towards the base of the cone 110. Moreover, the collar 120 effectively prevents trapped stink bugs from climbing back to the top of the cone 110.

Figure 8:
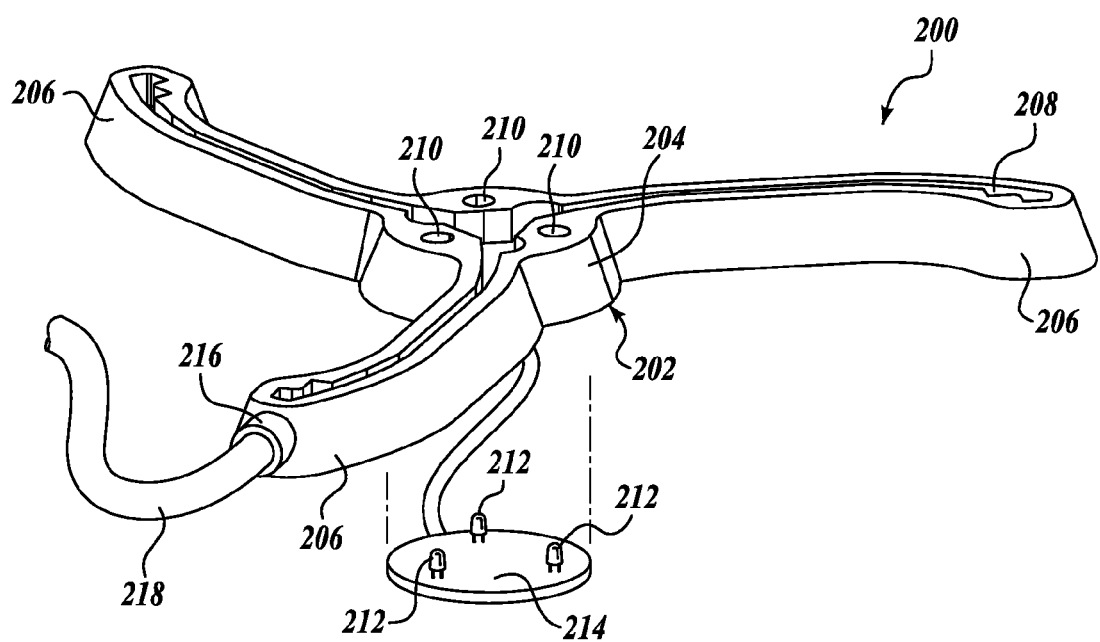
FIG. 8 is a partially exploded view of an illumination stand in accordance with the present invention and suitable for use with the insect traps shown in FIGS. 1A and 1B.

FIG. 8 is a partially exploded view of an illumination stand 200 suitable for use with insect traps, such as the insect trap 100. The illumination stand 200 in this embodiment comprises a unitary base member 202 having a center portion 204 and three outwardly extending arcuate arms 206. The base member 202 defines a Y-shaped slot 208 extending along most of the length of all three arcuate arms 206. The Y-shaped slot 208 is sized and shaped to slidably receive and retain the vanes 162 of the trap 100 (FIG. 1A).

The base member 202 further includes three upwardly oriented apertures 210 in the center portion 204. The apertures 210 are sized and positioned to receive corresponding lighting elements, for example, light-emitting diodes 212. The light-emitting diodes 212 may be conveniently mounted on a circuit board 214 or the like. The base member 202 may include a socket or jack 216 that is configured to receive power from an external source 218 to power the light-emitting diodes 212. Conventional items such as a power switch, dimmer, and the like (not shown) are also contemplated. In a currently preferred embodiment, one or more of the arcuate arms 206 are configured to receive a power source, such as an AA or AAA battery, obviating the need for the jack 216.

The light-emitting diodes 212 are preferably selected to emit light at a frequency or in a range of frequencies that are directed to attracting the particular insect 90 that is targeted by the trap 100. For example, in a current embodiment, the light-emitting diodes 212 emit light blue or near-blue portion of the spectrum, between 380 nm (blue/violet) and 495 nm (cyan/green). Certain bugs, including stink bugs, are better attracted with light having wavelengths in this range. In a particular embodiment, the emitted light has a wavelength in the range of 450-475 nm. It is contemplated that the apertures 210 may further include a lens, colored or transparent, (not shown) to obtain a desired light spread and color.

Figure 9:
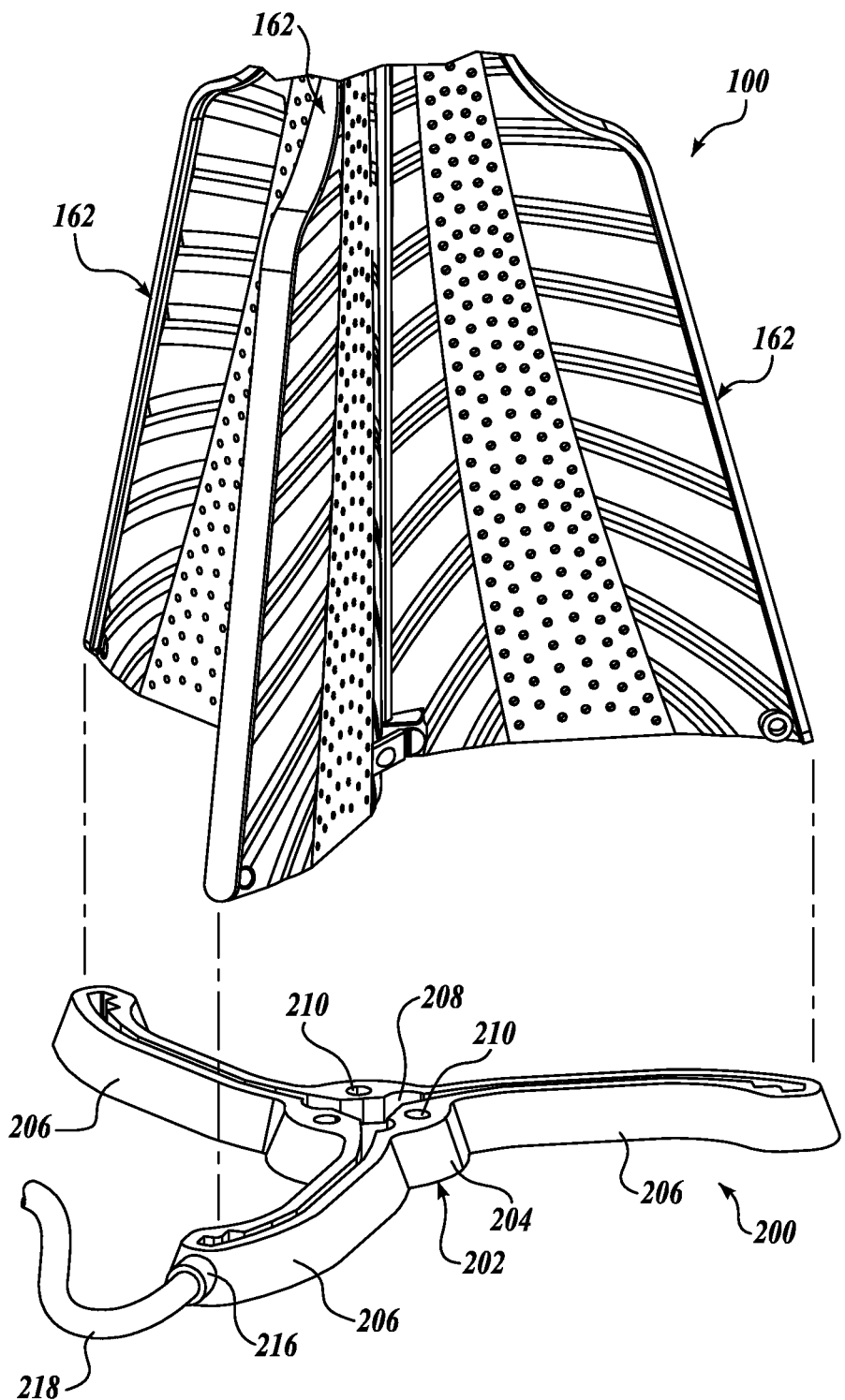
FIG. 9 is a perspective view illustrating the simple attachment of the insect trap into the illumination stand shown in FIG. 8.

FIG. 9 illustrates the assembly of the insect trap 100 (lower portion shown) into the illumination stand 200. The Y-shaped slot 208 is sized and shaped to slidably receive the vanes 162, and may be shaped to produce an interference or friction fit. The apertures 210 with the lighting elements 212 (not visible in FIG. 9) are disposed radially outwardly from the intersection of the vanes 162, such that the upwardly directed lights 212 will illuminate at least a portion of the vanes 162. The upwardly directed lights are preferably oriented to illuminate the entryways 170 to the trap 100 and interior structure (e.g., a portion of the cone 110).

Many insects, for example, brown marmorated stink bugs and kudzu bugs, are known to seek warmer environs when the weather gets cold, seeking a suitable location to overwinter. The stink bugs in particular have become a significant indoor pest, entering homes in large numbers in the fall and early winter in search of protected overwintering sites. Although the stink bugs will typically become relatively dormant in cold weather, they may become more active in the relative warmth of a home or other indoor environ. Currently, the best available method for controlling stink bugs indoors is to seal entry points such as cracks around windows and door trim, exhaust vents, and the like.

The attractant-baited insect trap 100 described above is effective for trapping insects such as stink bugs outdoors, and is typically deployed during summer and early fall. However, when the stink bugs go indoors when the weather cools in late fall, they may no longer be attracted by a conventional pheromone attractant in the traps. The illumination stand 200 allows the trap 100 to be used effectively indoors, without the use of a chemical attractant 92. The lighting elements 212 attract the stink bugs to the trap 100, where they are enticed to enter the trap 100, and become entrapped, as discussed above.

In laboratory trials, the illuminated trap 100 has been found to be highly effective for luring stink bugs (e.g., BMSBs and kudzu bugs) into the trap indoors without the use of any chemical attractant. The trap has also been found to be strongly attractive to other indoor pest insects such as Asian lady beetles, convergent lady beetles, boxelder bugs, cluster flies, and grass flies, among others.

The illumination stand 200 may also be used in outdoor applications, to increase the effectiveness of the trap. For example, the illuminated vanes 162 may be effective in luring the target insects from a greater distance into the neighborhood of the trap, wherein the insect may be further induced to enter the trap 100 by the plume generated from the chemical attractant 92 in the trap 100. In some cases, the reverse will also be true, i.e., the chemical attractant may be effective in luring target insects from a greater distance into the vicinity of the trap, wherein the insect may be further induced to enter the trap 100 by the light and/or chemical attractant. In some cases, the chemical attractant 92 is active during the daytime, whereas the light is attractive at night; thus the combination of the chemical attractant 92 and an illuminating device such as the illumination stand 200 may result in an additive affect. In other cases the chemical attractant 92 and illumination device may work simultaneously, especially during the night, and may provide significant synergistic effect on the target insect.

Figure 10:
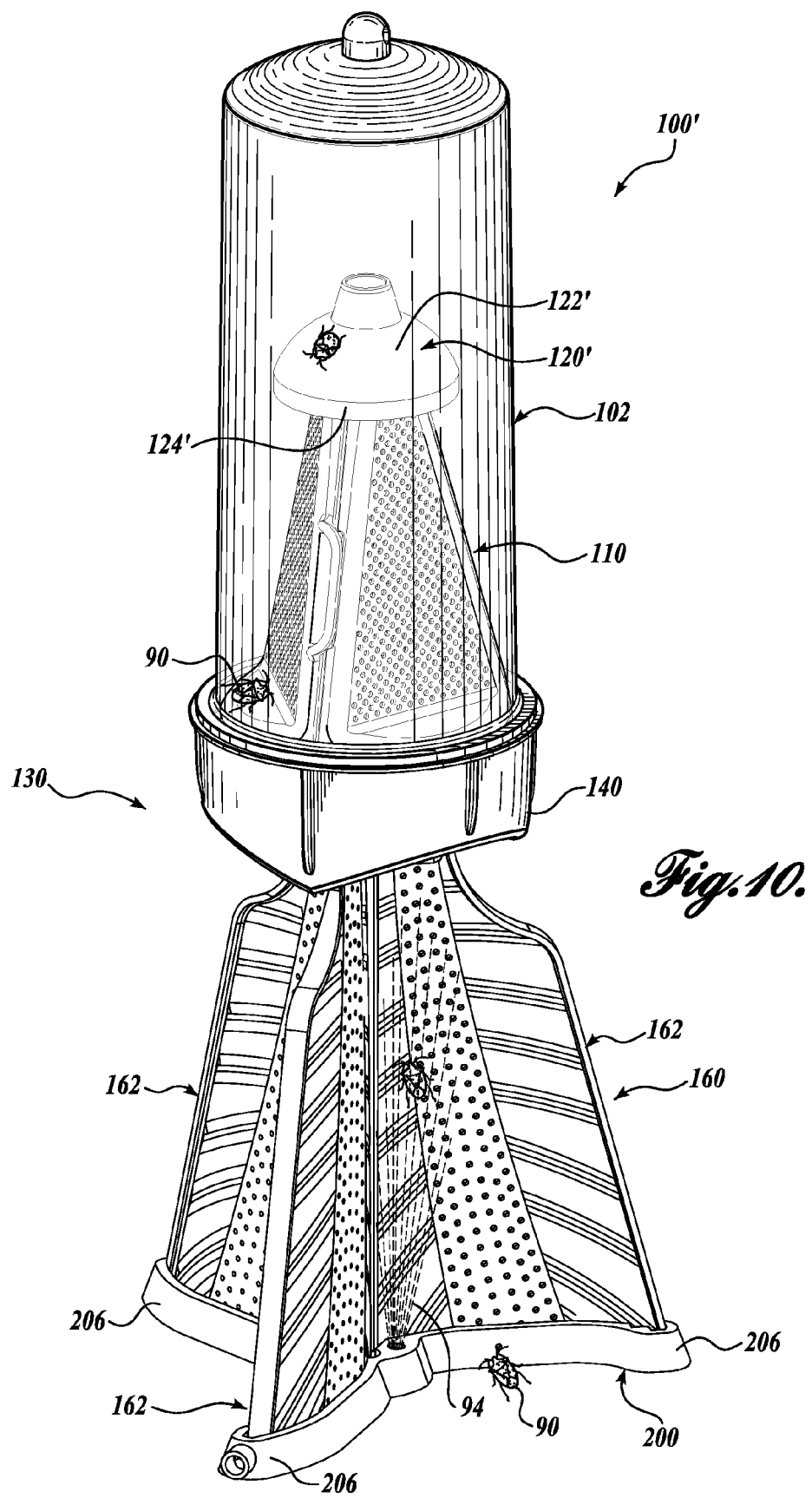
FIG. 10 is an environmental view showing an insect-trapping assembly in accordance with the present invention, and comprising the illumination stand shown in FIG. 8 with the insect trap shown in FIG. 1B.

FIG. 10 is an environmental view of the insect trap 100' assembled with the illumination base 200 such that the vanes 162 are frictionally retained in the illumination stand 200. The emitted light 94 from the light-emitting diodes 212 illuminates portions of the vanes 162. An additional advantage of the disclosed embodiment is that the curved, textured, and organic design of the vanes 162 produces an irregular illumination pattern on the vanes 162, which enhances the effectiveness of the light as an attractant. The irregular pattern of light more closely mimics natural lighting that may be encountered by the insects. The illuminated vanes, therefore, appear more natural to the target insects 90. Moreover, the light is directed upwardly towards the entryways, and illuminating portions of the cone 110, further directing and encouraging the target insects 90 to enter the trap 100. Because the entryways 170 and internal portions of the trap 100 are illuminated by the light-emitting diodes 212, the target insect 90 may perceive it is entering more open space, even as it is passing through the entryway 170.

Figure 11:
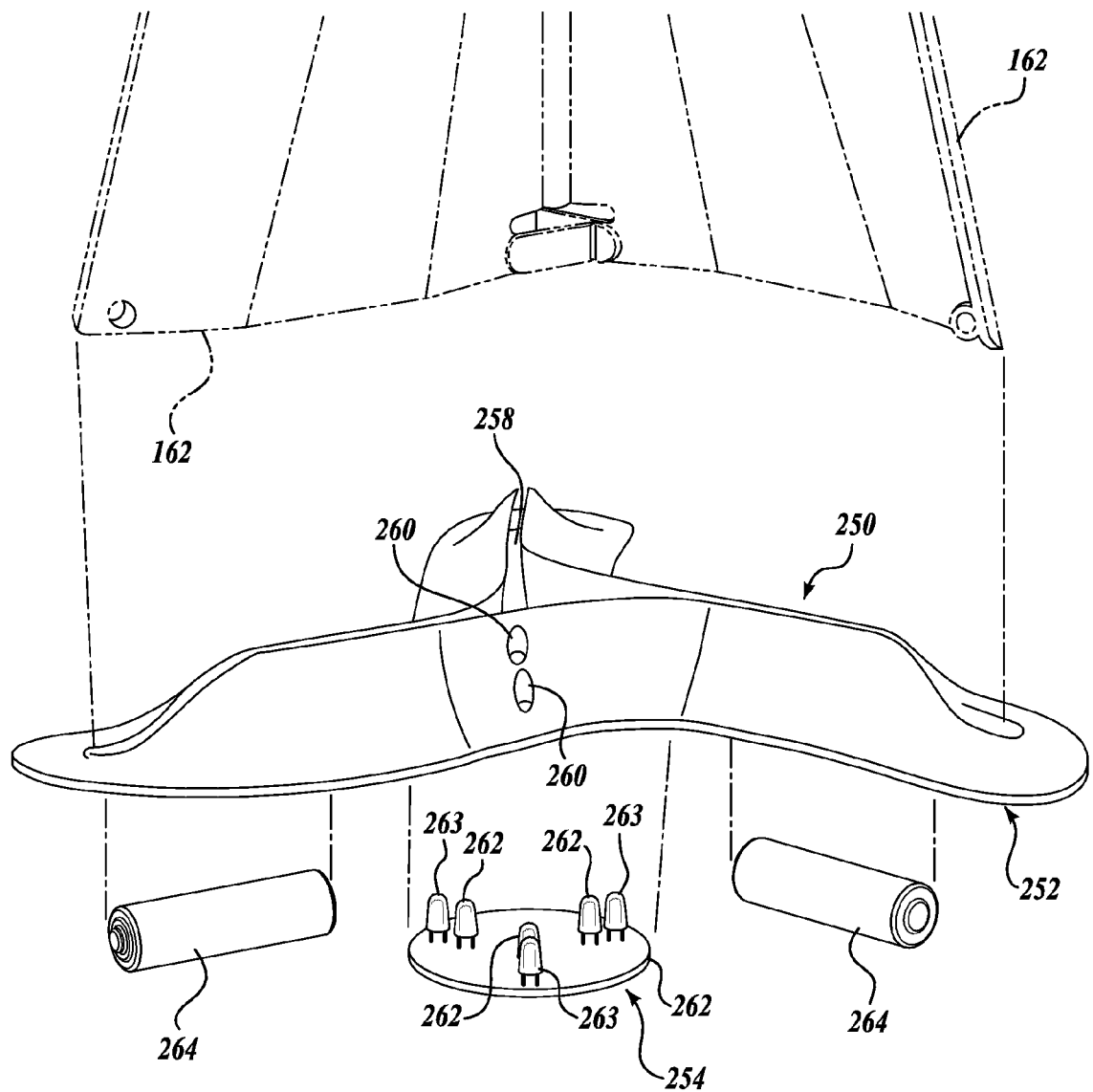
FIG. 11 shows a second embodiment of an illumination stand in accordance with the present invention for an insect trap.

A second embodiment of an illumination stand 250 is shown in FIG. 11, comprising a base member 252 having a generally Y-shaped slot 258 configured to receive the vanes 162 of the trap 100. In this embodiment, the lighting fixture 254 is energized with batteries 264 that are retained in the base member 252. The lighting fixture 254 includes two sets of light-emitting elements 262, 263, which are positioned and oriented to extend into corresponding apertures 260 in the base member 252. The properties of the lights 262, 263, for example, the color, intensity, etc., are selected to attract the target insect(s) 90. In a particular embodiment, the first set of lights 263 emit relatively broad spectrum light, for example, white light, and are configured to emit a relatively wide beam. The first set of lights 263 are therefore configured to illuminate all or most of the vanes 162 with a wide spectrum light. The first set of lights aid in making the trap 100 visible from longer distances. The second set of lights 262 emit a relatively narrow spectrum of light, for example, blue or near-blue light, and are configured to produce a narrow beam of light, directed towards the trap entryways 170.

In this configuration, therefore, the first set of lights 263 attract the target insect(s) 90 from relatively longer distances, and the second set of lights 262 aid in luring the insects into the trap 100.

Figure 12A:
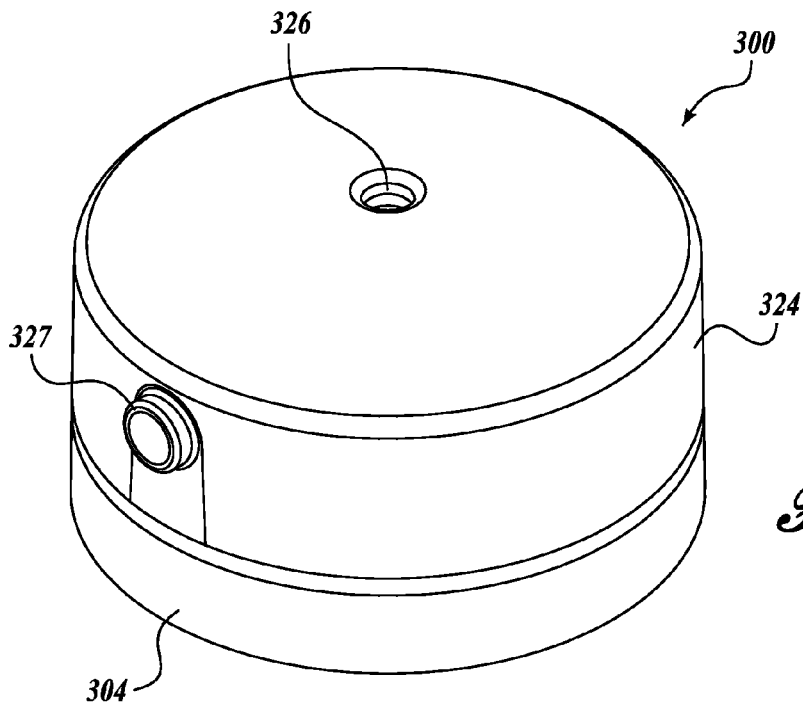
FIGS. 12A and 12B are perspective views of a cap-type illumination assembly in accordance with the present invention and suitable for use with the insect traps shown in FIGS. 1A and 1B.
Figure 12B:
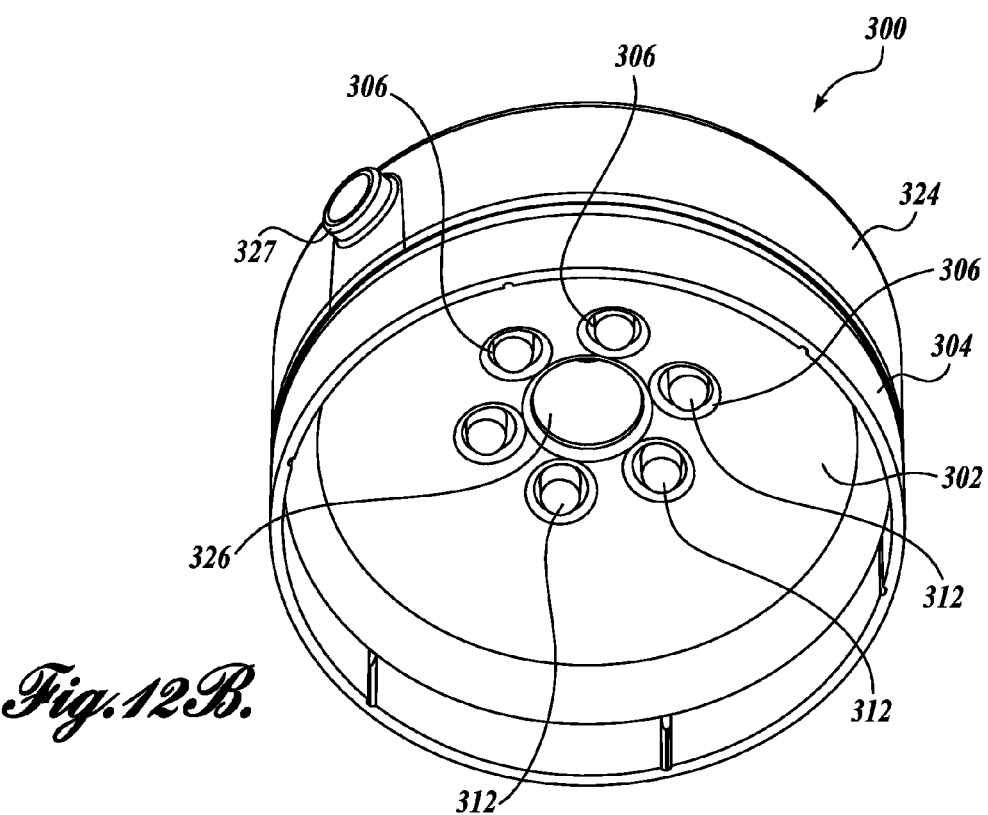

An upper perspective view of a cap-type illumination assembly 300 for an insect trap is shown in FIG. 12A, and a lower perspective view is shown in FIG. 12B. The cap-type illumination assembly 300 has a bowl-shaped lower portion 302 that is sized and shaped to fit over an upper end of an associated insect trap, for example, insect trap 100 described above (e.g., FIG. 1A). The illumination assembly 300 includes a light fixture having one or more lights (six shown), for example, light-emitting diodes 312 that are oriented downwardly, such that when energized, the lights 312 emit light into the entrapment chamber 102. In tests with brown marmorated stink bugs, kudzu bugs, Asian lady beetles, convergent lady beetles, cluster flies, and grass flies, the cap-type illumination assembly 300 has been found to be very effective in attracting insects into the trap 100.

In the current embodiment, the cap-type illumination assembly 300 is formed with a lower segment 304 shaped to fit over the entrapment chamber 102, and including six through apertures 306 that slidably receive the lights 312. An upper segment 324 is attached to the lower segment 304, for example, with a snap fit, threaded attachment, or the like, with the light fixture 314 (see FIG. 13) supported between, and substantially enclosed by the lower and upper segments 304, 324. Optionally, the lower and upper segments 304, 324 may cooperatively define a center aperture 326, such that a string, lanyard, or other attachment means (not shown) attached to the nib 108 on the entrapment chamber 102 may extend through the center aperture 326 for securing the trap 100 and illumination assembly 300 to an external support.

Figure 13:
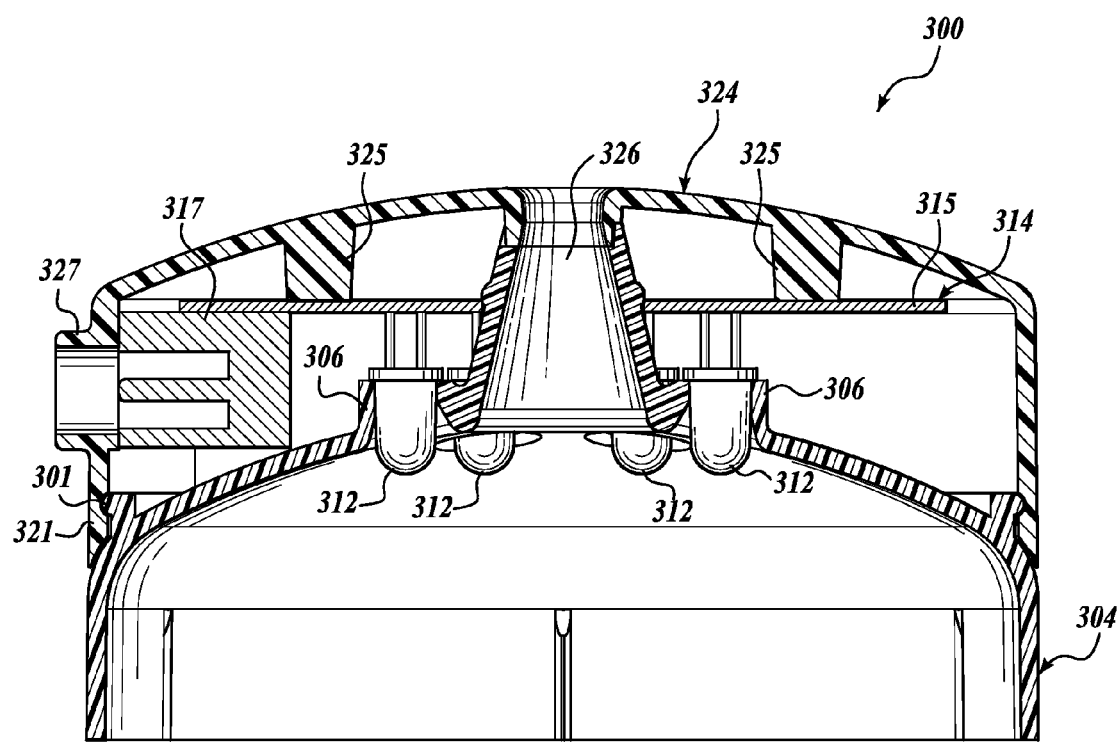
FIG. 13 is a side cross-sectional view of the cap-type illumination assembly shown in FIGS. 12A and 12B.

FIG. 13 is a side cross-sectional view of the cap-type illumination assembly 300. In this embodiment, the lower segment 304 includes an annular engagement member 301 that frictionally and releasably engages a channel in the wall 321 of the upper segment 324. The light fixture 314 mounts light-emitting diodes 312 on a circuit board 315 that further includes a power socket 317 that is configured to receive power from an external source, for example, a battery pack or a conventional plug-in power supply (not shown), to provide power to the lights 312. An aperture 327 in the upper segment 324 provides access to the socket 317. The light fixture 314 is attached to the upper segment 324 through a plurality of standoffs 325. Therefore, to assemble the illumination assembly 300, the light fixture 314 is attached to the upper segment 324 through the standoffs 325, and the upper segment 324 is positioned over the lower segment 304 such that the lights 312 extend into the through apertures 306, and the lower and upper segments 304, 324 snap together.

Although the illumination assembly 300 is currently configured to be powered externally, it will be appreciated that other means may be used, for example, internal batteries.

Figure 14:
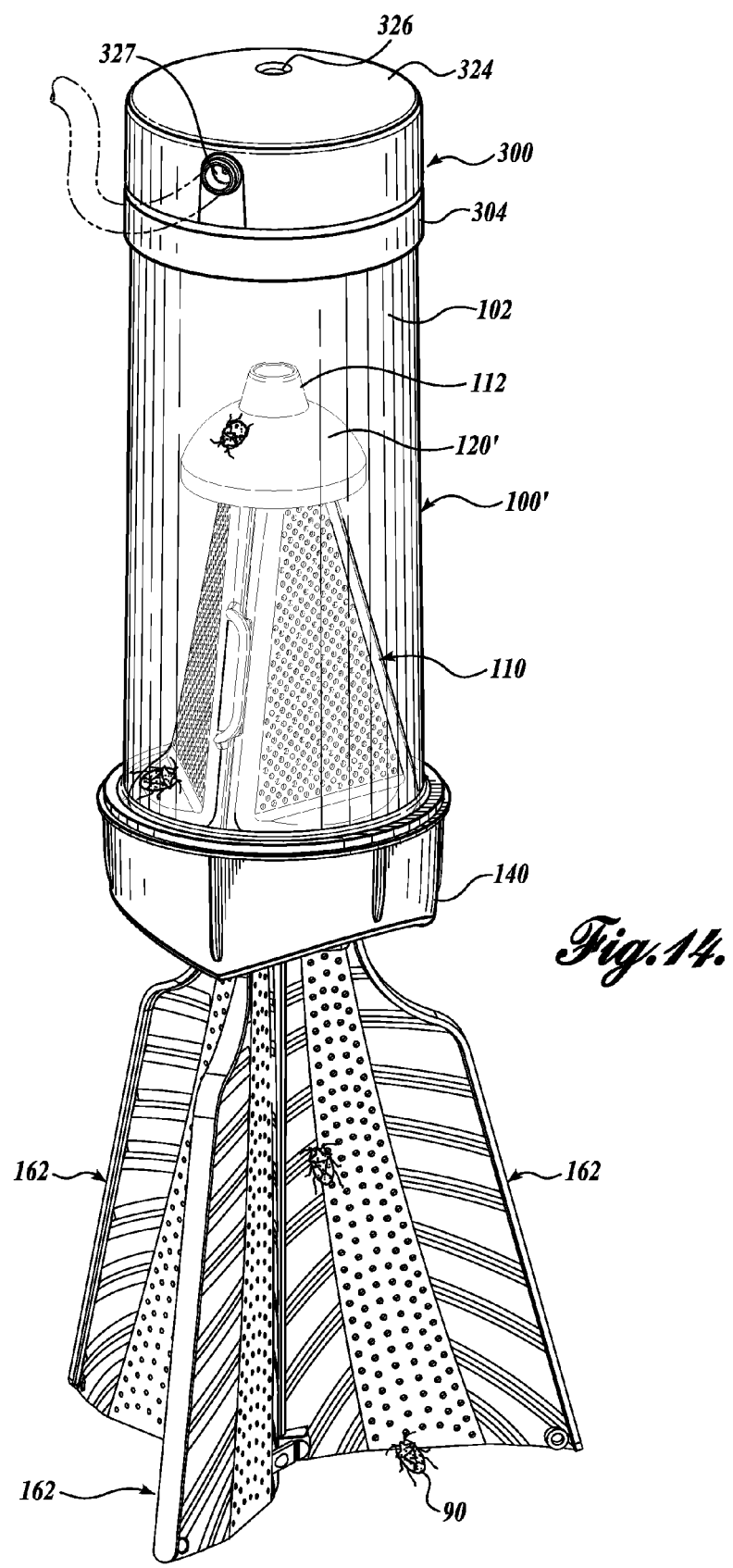
FIG. 14 shows an insect-trapping assembly comprising the cap-type illumination assembly shown in FIGS. 12A and 12B attached to the insect trap shown in FIG. 1B.

FIG. 14 shows an insect control device comprising the insect trap 100 shown in FIG. 1B with the cap-type illumination assembly 300 shown in FIGS. 12A and 12B. The lights 312 in the illumination assembly 300 are directed downwardly through the transparent top of the entrapment chamber 102, illuminating the interior of the trap 100. The light at least partially reflects off the entrapment chamber, cone 110, and collar 120' such that the interior of the trap 100 is well illuminated. As discussed above, the cone 110 has an upper aperture 112 and has a plurality of small apertures through the walls. Therefore, the cone 110 allows light transmission through the cone 110 and through the center aperture of the annular lid 140, thereby diffusely illuminating the vanes 162 below.

Therefore, insects alighting on or near the vanes 162 will perceive the diffusely illuminated vanes 162 with progressively brighter lighting of the cone 110, leading the insects toward the entryways 170. The lighting from above provided by the cap-type illumination assembly 300 has been found to be more effective at attracting certain insects into the trap 100 than the base-mounted lighting described above. The improved effectiveness may be the result of the cap-type illumination assembly 300 providing lighting cues to such insects that more closely emulate natural lighting filtering through plant foliage and the like.

Illumination devices have been described that are suitable for attracting insects or other pestiferous animals. In particular, illumination devices that emit light upwardly toward the entryways have been specifically described and are shown in FIGS. 8-11. Also, an illumination device that emits light downwardly toward the entryways has been specifically described and is shown in FIGS. 12A-14. Alternative arrangements may be constructed in accordance with the teachings of the present application and may be preferred for attracting a particular pestiferous species. For example, the "bottom-up" and "top-down" lighting systems may alternatively be arranged to provide illumination from a different angle. It may be advantageous in some applications, for example, to provide a collar about the entrapment chamber, directing light into the chamber from the sides. Alternatively, a lighting source may be provided on an articulated support, such that the light is disposed a distance away from the entrapment chamber, and at an angle, perhaps to more closely simulate a particular time of day, such as sunset.

In particular, it is contemplated that the wavelength of the light source(s) may be selected to match a color preferred by the target insect. For example, in a currently preferred embodiment of the present lighting devices light source, e.g., light-emitting diodes 212 emit light in the blue or near-blue portion of the spectrum, between 380 nm (violet) and 495 nm (cyan/green). Stink bugs are preferentially attracted with light having wavelengths in this range. In a particular embodiment, the emitted light has a wavelength in the range of 450-475 nm.

Alternatively, in some applications it may be preferable to position a light source inside the entrapment chamber. For example, the entrapment chamber may be opaque (or provided with an opaque cover) with an internal light source, such that only the entryways are illuminated. An internal light source may better attract certain pests, and may also make the trap less intrusive when used in the home.

It is also contemplated by the present invention that the quality of the lights, e.g., the color, intensity, and beam width, may be preselected for the desired target pest, as discussed above, and/or may be provided with means for adjusting such characteristics. For example, a dimmer switch may be provided, or colored and/or focusable lenses may be provided.

In another contemplated embodiment, the lighting systems may be configured to be dynamic, varying over time, to improve the attraction to particular pests. For example, the light-emitting diodes 312 of the cap-type illumination assembly 300 described above may be sequentially illuminated, dimmed, or have the emitted color modulated to simulate motion. It is also contemplated that the lights may be provided on a mechanism to move. For example, it may be advantageous in certain situations to oscillate the light fixture.

It is contemplated that any of the lighting systems may include an optional photosensitive device configured to turn the LED lights 212, 262, 263, 312 off during daylight and to turn the LED lights on when it is dark.

Target insects include all of the light-attracted (phototropic) insects, in particular, some of the common indoor nuisance insect pests such as BMSBs, kudzu bugs, boxelder bugs, Asian lady beetles, convergent lady beetles, cluster flies, and grass flies, etc.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An insect entrapment assembly comprising:
   a trap including (i) a transparent entrapment chamber having an open end and a closed opposite end, (ii) an entry structure removably attached to the open end of the entrapment chamber, (iii) an entry cone extending from the entry structure into the entrapment chamber, and (iv) a plurality of vanes extending downwardly from the entry structure; and
   an illumination device comprising:
      a plurality of lighting elements; and
      a support structure having a lower tubular portion sized and configured to slidably receive the closed opposite end of the transparent entrapment chamber, the support structure further comprising an upper portion that houses the plurality of lighting elements outside the entrapment chamber such that light emitted from the lighting elements is directed through the closed opposite end of the transparent entrapment chamber into the entrapment chamber towards the entry structure.

2. The insect entrapment assembly of claim 1, wherein at least some of the plurality of lighting elements comprise light-emitting diodes.

3. The insect entrapment assembly of claim 1, wherein at least some of the plurality of lighting elements emit light having a wavelength between 380 nm and 495 nm.

4. The insect entrapment assembly of claim 3, wherein at least some others of the plurality of lighting elements emit a white light.

5. The insect entrapment assembly of claim 1, wherein at least some of the plurality of lighting elements emit light having a wavelength between 450 nm and 475 nm.

6. The insect entrapment assembly of claim 2, wherein the light-emitting diodes emit light having a wavelength that is targeted specifically to a target insect.

* * * * *